(12) United States Patent
Witzigreuter

(10) Patent No.: US 6,461,765 B1
(45) Date of Patent: Oct. 8, 2002

(54) METAL-AIR CELL HOUSING WITH IMPROVED PERIPHERAL SEAL DESIGN

(75) Inventor: John D. Witzigreuter, Kennesaw, GA (US)

(73) Assignee: Aer Energy Resources Inc., Smyrna, GA (US)

( * ) Notice: Subject to any disclaimer, the term of this patent is extended or adjusted under 35 U.S.C. 154(b) by 0 days.

(21) Appl. No.: 09/504,010

(22) Filed: Feb. 14, 2000

(51) Int. Cl.[7] ................................. H01M 2/04
(52) U.S. Cl. .................. 429/176; 429/175; 429/177
(58) Field of Search ................... 429/176, 175, 429/163, 177, 186, 34, 12, 162

(56) References Cited

U.S. PATENT DOCUMENTS

| | | |
|---|---|---|
| 2,620,368 A | 12/1952 | Ruben |
| 2,629,758 A | 2/1953 | Ruben |
| 2,650,945 A | 9/1953 | Herbert |
| 3,855,000 A | 12/1974 | Jammet |
| 3,897,265 A | 7/1975 | Jaggard |
| 3,961,985 A | 6/1976 | Takamura et al. |
| 4,041,211 A | 8/1977 | Wiacek |
| 4,054,726 A | 10/1977 | Sauer et al. |
| 4,105,830 A | 8/1978 | Kordesch |
| 4,118,544 A | 10/1978 | Przybla et al. |
| 4,333,993 A | 6/1982 | Gibbard |
| 4,343,869 A | 8/1982 | Oltman et al. |
| 4,404,266 A | 9/1983 | Smilanich |
| 4,557,983 A | 12/1985 | Sauer |
| 4,591,539 A | 5/1986 | Oltman et al. |
| 4,725,515 A | 2/1988 | Jurca |
| 5,328,777 A | 7/1994 | Bentz et al. |
| 5,328,778 A | 7/1994 | Woodruff et al. |
| 5,458,988 A | 10/1995 | Putt |
| 5,554,452 A | 9/1996 | Delmolino et al. |
| 6,057,052 A * | 5/2000 | Shrim et al. ................ 429/27 |
| 6,068,944 A * | 5/2000 | Witzigreuter ............... 429/27 |
| 6,242,121 B1 * | 6/2001 | Pedicini et al. ............ 429/27 |

FOREIGN PATENT DOCUMENTS

| | | |
|---|---|---|
| GB | 1 360 779 | 7/1974 |
| JP | 55-111060 | 8/1980 |
| JP | 58-169777 | 10/1983 |
| JP | 59-63659 | 4/1984 |
| JP | 60-189158 | 9/1985 |
| JP | 62-200652 | 9/1987 |
| JP | 05-314957 | 11/1993 |

* cited by examiner

*Primary Examiner*—Stephen Kalafut
*Assistant Examiner*—R. Alejandro

(57) ABSTRACT

A metal-air cell housing structure provides a generally L-shaped peripheral grid comprising an upper leg ultrasonically welded to the top edge of a peripheral wall of a lower housing section, and a downwardly extending leg positioned to hold an air electrode against the central panel of the lower housing section. An upper housing section encloses the lower housing section with a top panel and an outer peripheral wall that extends downwardly adjacent to and is adhered to the peripheral grid and the lower housing peripheral wall.

7 Claims, 3 Drawing Sheets

METAL-AIR CELL HOUSING WITH IMPROVED PERIPHERAL SEAL DESIGN

TECHNICAL FIELD

The present invention relates to metal-air cells having an air electrode and a liquid or paste electrolyte, and more particularly relates to metal-air cells of the type having two housing sections that must be sealed where the peripheral edges of the housing sections meet.

BACKGROUND ART

Considerable progress has been made in developing metal-air cells for portable electronic devices ranging from hearing aids to cellular telephones and laptop computers. Both primary and secondary cells have been developed using a variety of metal anodes and electrolyte materials, but zinc and potassium hydroxide have been particularly successful. In the case of a primary cell, the zinc and KOH are typically formed into a paste filling the volume of the cell between the air electrode and the surrounding housing walls. In secondary cells, liquid KOH fills the enclosure, surrounding a metallic zinc anode.

Leakage of electrolyte can be a problem in both primary and secondary metal-air cells. If the electrolyte has a path around the separator that lies between the cathode and the anode, for example along the housing wall, the electrolyte may leak out along the leads from the current collectors and result in the cell drying out prematurely. Some prior cells have included interior peripheral grids positioned around the wall of the cathode portion of the housing to hold down the separator and cathode. Hot melt adhesive secured the grid to the housing wall. These grids have had success in reducing leakage, but they occupy space within the housing, reducing the volume of anode paste, and require an extra gluing step during manufacture. The KOH tends to migrate through any gaps that may be left, or may develop, in the hot melt adhesive bond between the grid and the housing wall. Furthermore, there are two possible paths around the cathode/separator assembly, under the grid where it presses down on the cathode/separator assembly, and down between the grid and the housing wall.

One cell structure that has been developed attempting to solve this problem involves molding an inner peripheral wall within the anode portion of the housing, filling that portion with anode paste, and inserting the peripheral wall of the cathode portion into the gap between the anode portion walls so that the inner wall presses against the cathode assembly. Disadvantages of this approach include the need to invert the cell after assembly, and the need to form an adhesive bond within the gap.

Thus, there is a need in the art for a metal-air housing structure that resists electrolyte leakage, and allows for simple assembly.

SUMMARY OF THE INVENTION

The present invention seeks to provide an improved metal-air housing structure that protects well against electrolyte leakage, requires no hot melt adhesive, locks the cathode assembly flat in place in the housing, provides no potential leak path between a locking member and the cell housing, and allows for simple assembly, permitting the cathode portion of the housing to be filled with anode material to avoid a need for inverting the cell.

This object is accomplished in a metal-air cell constructed with an enclosure according to the present invention, comprising a lower housing section having a central member and an upstanding peripheral wall, the peripheral wall defining a top edge thereof; a generally L-shaped peripheral grid comprising an upper leg attached to the top edge of the lower housing peripheral wall, and a downwardly extending leg positioned to hold the air electrode against the central member; and an upper housing section enclosing the lower housing section and comprising an outer peripheral wall extending downwardly adjacent to and adhered to the peripheral grid and the lower housing peripheral wall. The upper leg preferably is ultrasonically welded to the top edge of the lower housing peripheral wall.

The outer peripheral wall of the described structure may be fused to the grid and the lower housing peripheral wall by a solvent bonding agent, avoiding the need for any hot melt adhesive. Furthermore, the upper leg of the L-shaped grid closes off any path between the grid and the inner wall surface of the lower housing. Any electrolyte migrating over the upper leg would have to defeat the solvent bond and pass through the ultrasonic weld to find a path between the grid and the inner wall surface. To defeat leakage under the downwardly extending leg, a sealant, such as Versamid adhesive or an asphalt sealant, may in a preferred embodiment be placed between the periphery of the air electrode and the downwardly extending leg and between the periphery of the air electrode and the central member of the lower housing.

The present invention also contemplates a corresponding method of enclosing components of a metal-air cell, comprising providing a lower housing section comprising a central member and an upstanding peripheral wall, the peripheral wall defining a top edge thereof; placing an air electrode in the lower housing section; placing a generally L-shaped peripheral grid onto the lower housing section, with an upper leg of the grid resting on the top edge of the peripheral wall, and a clamping leg extending downwardly inside the peripheral wall and pressing against the air electrode; positioning an ultrasonic horn against the upper leg of the grid and energizing the horn to weld the grid onto the top edge of the lower housing peripheral wall; filling the lower housing section with metal electrode and electrolyte material; covering the lower housing section with an upper housing section comprising an outer peripheral wall; and adhering the outer peripheral wall to the grid and to the lower housing peripheral wall.

According another aspect, the invention provides an enclosure for an electrochemical cell including an electrode, comprising a lower housing section comprising a central member and an upstanding peripheral wall, the peripheral wall defining a top edge thereof; a grid insert comprising a peripheral upper leg attached to the top edge of the lower housing peripheral wall, and a downwardly extending leg positioned to hold the electrode against the central member; and an upper housing section enclosing the lower housing section.

Other objects, features, and advantages of the present invention will be understood after reference to the following detailed description of a preferred embodiment of the invention, when taken in conjunction with the drawings and the appended claims.

DETAILED DESCRIPTION

Figure 1:
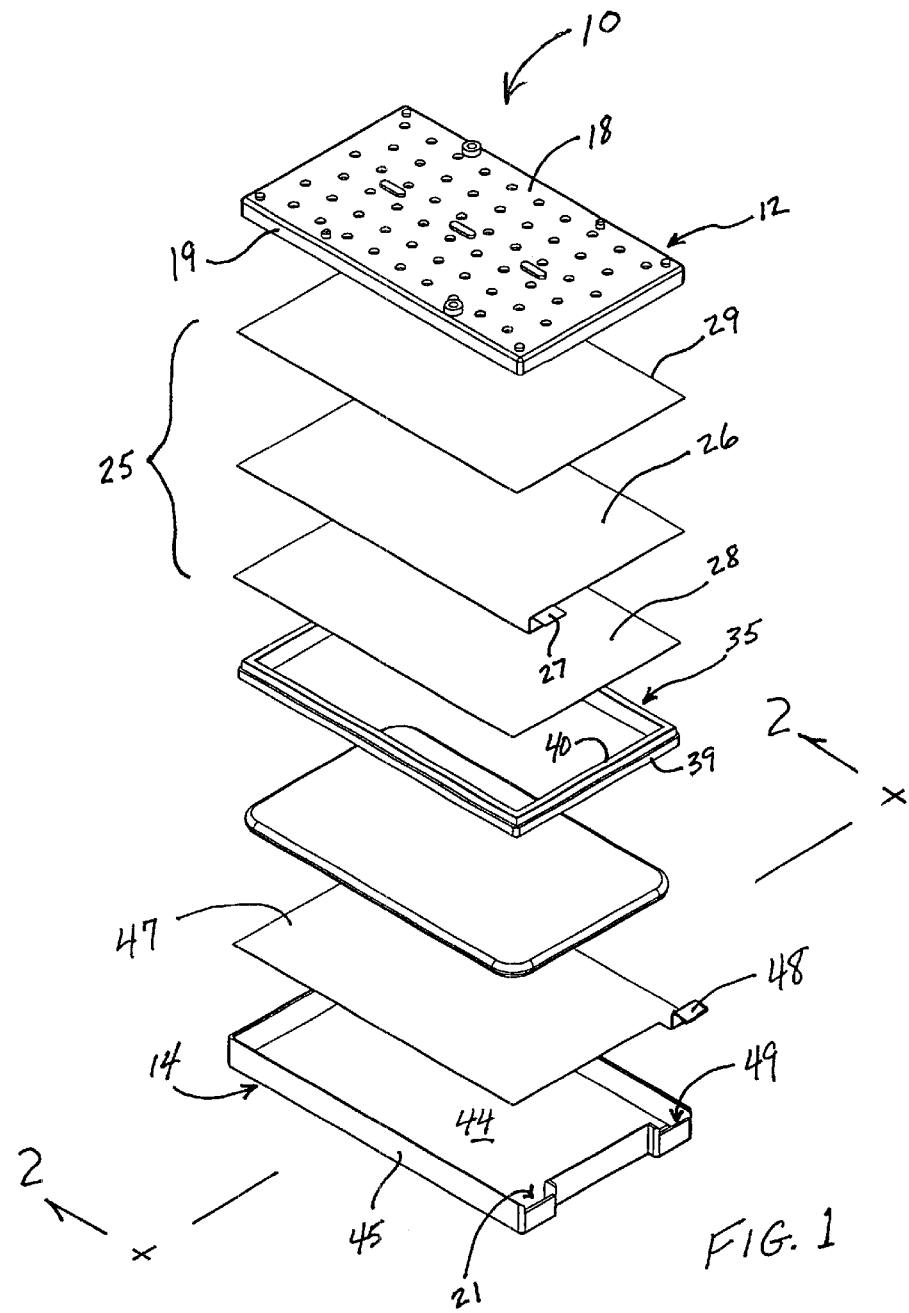
FIG. 1 is an exploded pictorial view of a metal-air cell embodying the present invention.
Figure 2:
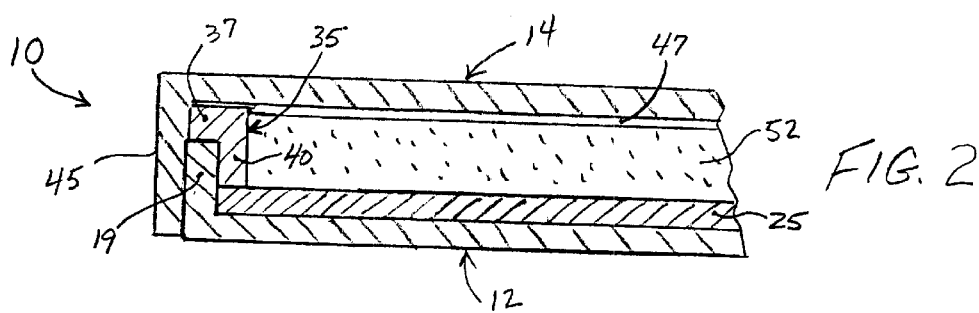
FIG. 2 is a cross-sectional view of the assembled cell of FIG. 1, taken along line 2—2 of FIG. 1.

Referring now in more detail to the drawings, in which like numerals refer to like parts throughout the several views, FIGS. 1 and 2 show a metal-air cell 10 embodying the present invention. Components of the cell 10 are enclosed between a cathode housing section 12, the lower housing section in the drawings, and an anode housing section 14, the upper housing section as shown. The housing sections 12 and 14 may be made of plastic, metal or another suitable material, but preferably are made of an ultrasonically weldable plastic, preferably ABS. Other weldable plastics, such as polypropylene or styrene, may also be used.

The cathode housing section 12 includes a perforated central panel 18 surrounded by a peripheral wall 19 having a top edge 20. In the embodiment shown, the cell 10 is prismatic in shape, and thus the central panel is a flat rectangle and the wall 19 includes four sections, one along each side of the central panel 18. Another example of the cell 10 is a cylindrical button cell having a circular central panel and a cylindrical peripheral wall. An energy director in the form of a triangular ridge 22 runs continuously along the center of the top edge 20 of the wall 19, completely around the cathode housing section 12. At the base of the peripheral wall 19, a bead of Versamid adhesive or an asphalt-based sealant is laid down on the periphery of the central panel 18.

The cell 10 also includes an air cathode assembly 25 comprising an air cathode 26 with an embedded current collector that is connected to a terminal tab 27. A separator sheet 28 is tacked to the upper surface of the cathode 26 by adhesive, and the cathode assembly 25 is placed into the cathode housing section 12 against the adhesive bead 23, with the terminal tab 27 extending out over the wall 19. An absorbent sheet or diaper 29 may be placed into the cathode housing section 12 between the cathode 26 and the central panel 18. The cathode, diaper and separator may be formed of conventional materials, and constructed as described in U.S. Pat. Nos. 5,356,729 or 5,641,588 or 5,569,551, which are incorporated herein by reference. Another bead 32 of Versamid adhesive or asphalt sealant is laid around the periphery of the upper surface of the cathode assembly 25.

The cathode assembly 25 is secured in place within the cathode housing section 12 by a clamping grid 35. The grid 35 has an L-shaped cross section, best shown in FIG. 2, and extends completely around the housing 12. An upper leg 37 of the grid 35 has a bottom surface 38 that is ultrasonically welded to the top edge 20 of the cathode housing wall 19, so that an outer surface 39 of the leg 37 is approximately even with the outer surface of the wall 19. From the leg 37, a downwardly extending leg 40 is positioned to closely fit within the wall 19 and to press down against the cathode assembly 25. The Versamid adhesive or asphalt sealant 32 seals the interface between the cathode assembly and the leg 40.

The anode housing section 14 includes a central panel 44 and a peripheral wall 45 extending downwardly from the periphery of the central panel 44. Along one side of the anode housing section 14, the wall 45 protrudes outwardly at two locations to form a cathode terminal exit well 21 and an anode terminal exit well 49. An anode current collector 47 is heat staked or otherwise secured within the anode housing section, with a terminal tab 48 extending through the exit well 49 in the peripheral wall 45. The anode housing section 14 is secured over the cathode housing section 12 by a solvent such as methyl acetate, which forms a solvent bond or weld between the peripheral wall 45 and both the outer surface of the upper leg 37 of the grid 35 and the peripheral wall 19 of the cathode housing section 12. Where the terminal tabs 27 and 48 pass through the exit wells 21 and 49, the openings are sealed by potting the exit wells with epoxy potting compound.

Between the housing sections 12 and 14, a measured quantity of anode paste 52, preferably a combination of zinc particles and liquid potassium hydroxide electrolyte, approximately fills the space within the cell 10 and contacts the anode current collector 47. It may be seen that the liquid electrolyte has no easy leak path around the separator 28 to the cathode 26 or to the exterior of the cell 10. The Versamid adhesive or asphalt sealant penetrates into the separator material, sealing the separator 28 to the grid leg 40, which also clamps the peripheral edge of the cathode assembly against the central panel 18 of the cathode housing section 12. Therefore, the electrolyte cannot readily penetrate under the grid leg 40; if any electrolyte does get under the grid leg 40, it is stopped by the sealant 23 under the cathode. Any electrolyte migrating across the top of the upper leg 37 or the grid 35 encounters the solvent bond between the upper leg 37 and the peripheral wall 45 of the anode housing section 14. If the electrolyte penetrates the solvent bond, it must then penetrate the ultrasonic weld between the upper leg 37 and the top edge 20 of the peripheral wall 19 of the cathode housing section 12 to be able to move down between the grid and the wall 19.

Figure 3A:
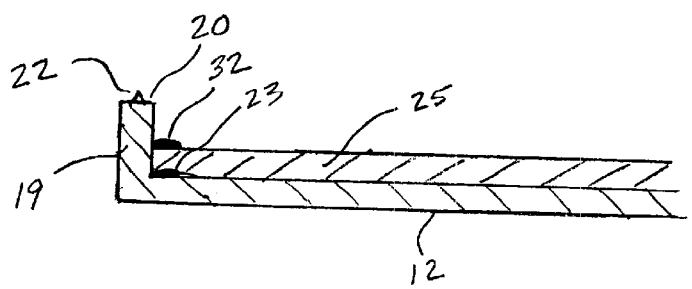
FIGS. 3A through 3E show the sequence of assembly of the metal-air cell according to the present invention.

The cell 10 may be assembled as follows, referring to FIGS. 3A to 3E. The housing sections 12 and 14, and the grid 35, are injection molded from ABS plastic material using conventional methods. The cathode assembly 25 is prepared in a known manner by coating a current collector with known catalysts and affixing it to a separator sheet 28. The adhesive bead 23 is laid down within the housing section 12, and the cathode assembly 25 is installed as shown in FIG. 3A in the bottom of the housing section 12 with the terminal tab 27 aligned with the position where the exit well 21 will be.

Figure 3B:
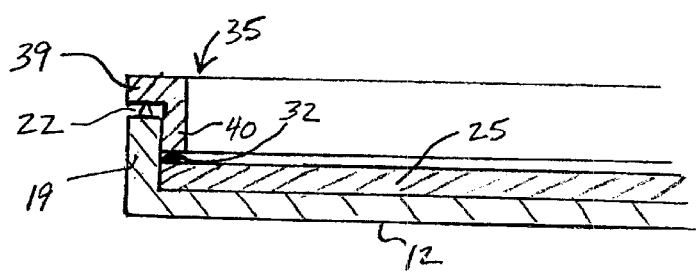
Figure 3C:
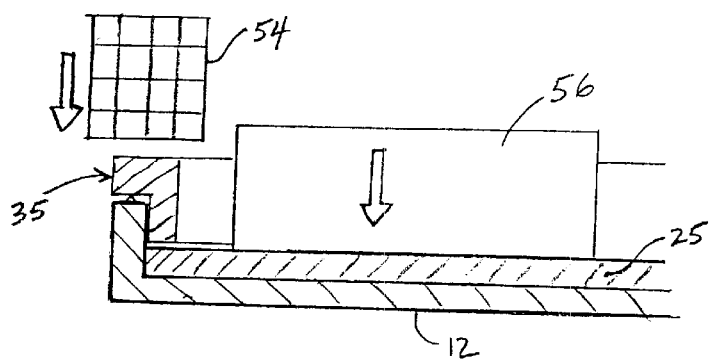

After applying the bead 32 of adhesive around the cathode assembly, the grid 35 is placed within the housing section 12 as shown in FIG. 3B, with the grid leg 40 in contact with the adhesive bead 32, and the surface 38 in contact with the energy director ridge 22. As shown in FIG. 3C, a spring preload press 56 is lowered into the housing section 12 to flatten the cathode assembly 25 with a predetermined amount of pressure. Then an ultrasonic horn 54 having a shape matching the shape of the grid 35 and the peripheral wall 19 is activated and lowered onto the grid 35. The energy director ridge 22 concentrates the ultrasonic energy from the horn 54, allowing the energy to uniformly melt and weld the plastic of the upper leg 37 to the wall 19 along the line of the ridge 22. When the plastic is softened, the upper leg 37 moves to contact the top edge 20 of the wall 19, so that the other grid leg 40 extends to a predetermined distance, preferably about 0.05 cm, from the central panel 18, thereby exerting a desired pressure on the periphery of the cathode assembly 25.

The ultrasonic horn is of conventional construction, and its use to weld plastic such as ABS is well known. The horn focuses intense ultrasonic energy along the energy director ridge 22. The spring preload press 56 preferably presses against the cathode assembly with a force of about 1 to 3 pounds per square inch.

Figure 3D:
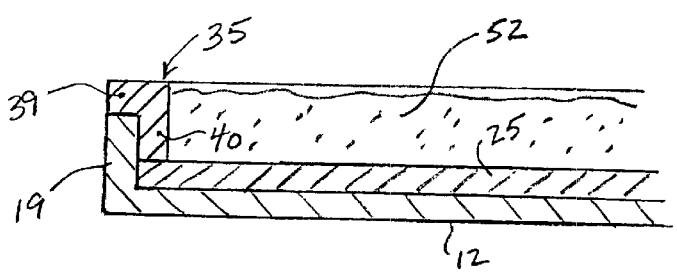
Figure 3E:
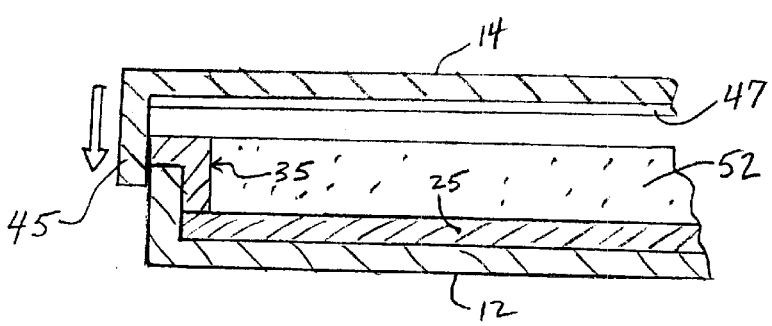

The anode current collector 47 is heat staked to the anode housing section 14, with the anode terminal tab 48 extending through the exit well 49. Next, the space within the grid 35 is filled with anode paste, as shown in FIG. 3D. Then, the outside of the wall 19 and the grid leg 37, and/or the inner surface of the peripheral wall 45 of the anode housing section 14, are coated with methyl acetate solvent, and the anode housing section 14 is fitted over the cathode housing section 12, as shown in FIG. 3E. A continuous solvent bond is formed between the surface 39 of the grid leg 37 and the wall 45, as well as between the respective peripheral walls 45 and 19. The housing section 14 further locks the grid 35 in place and retains the anode paste 52. The exit wells 21 and 49 are potted with epoxy to seal around the terminal tabs 27 and 48.

Figure 4:
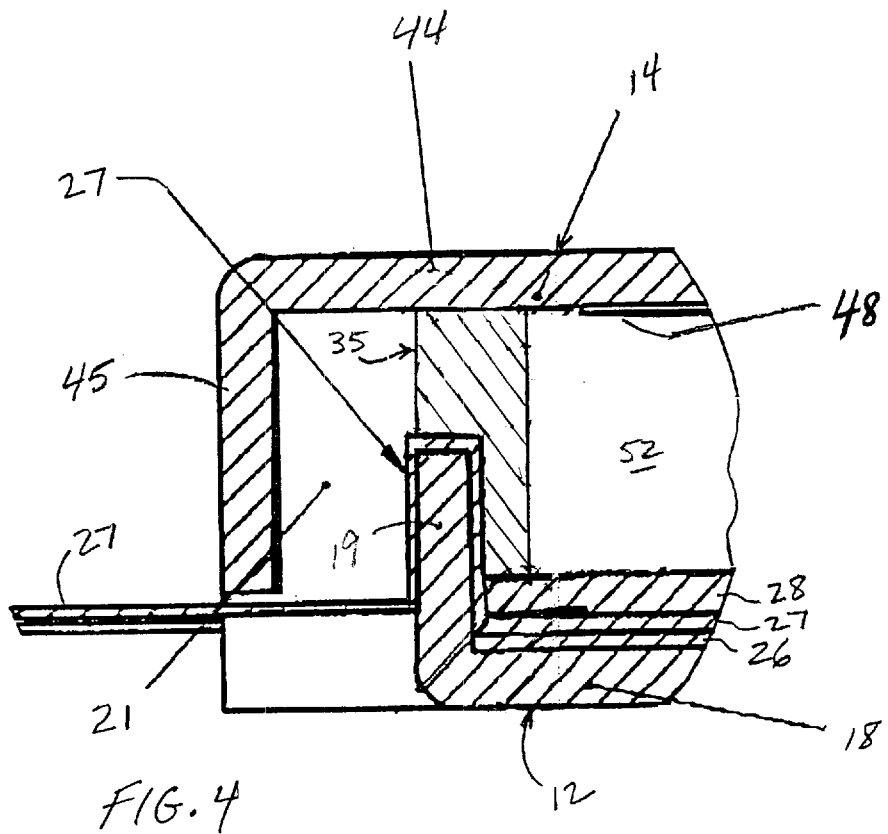
FIG. 4 is a partial cross-sectional view of the cathode terminal tab extending through the exit well.
Figure 5:
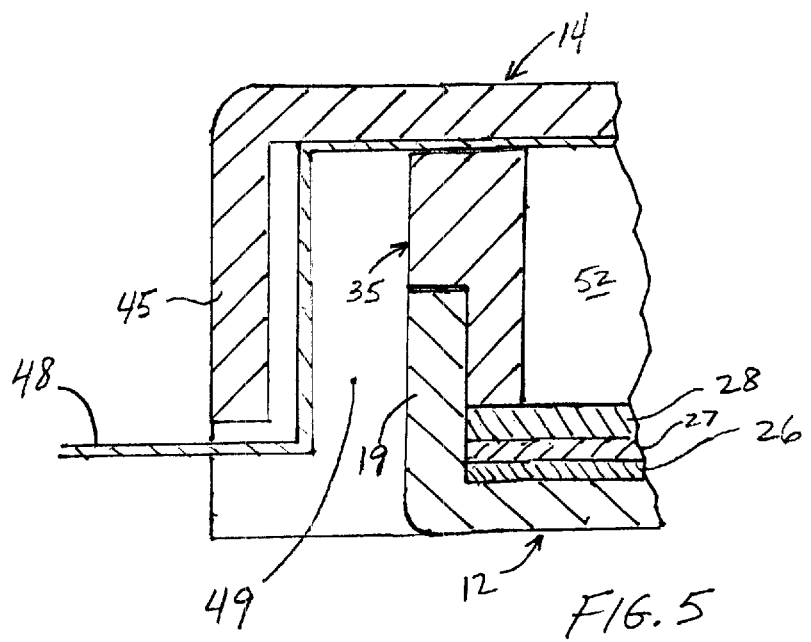
FIG. 5 is a partial cross-sectional view of the anode terminal tab extending through the exit well.

The cathode terminal tab 27 is shown extending through the exit well 21 (filled with epoxy) in FIG. 4. The anode terminal tab 48 is shown extending through the exit well 49 (filled with epoxy) in FIG. 5.

From the foregoing it may be seen that the completed metal-air cell housing protects well against electrolyte leakage, requires no hot melt adhesive, locks the cathode assembly flat in place in the housing, provides no potential leak path between a locking member and the cell housing, and allows for simple assembly. The assembly of the cell takes place with the cathode facing downwardly in the preferred orientation, so that no inversion of the cell following assembly is required.

It should be noted that the structure of the present invention provides an advantage for all types of metal-air cells, primary and secondary. Such advantages do not depend on the structure or composition of the air cathode, separator, electrolyte, or anode, when there is a liquid electrolyte in free liquid or paste form.

Terms such as "upper" and "lower" are used herein to provide a frame of reference, and do not indicate any required orientation of the metal-air cell.

While this invention has been described in detail with particular reference to a preferred embodiment thereof, it will be understood that modifications and variations may be made without departing from the scope of the invention as defined in the appended claims.

What is claimed is:

1. An enclosure for an electrochemical cell, comprising:
    a lower housing section comprising a central member and an upstanding peripheral wall, the peripheral wall defining a top edge thereof;
    a generally L-shaped peripheral grid comprising an upper leg attached to the top edge of said lower housing peripheral wall, and a downwardly extending leg extending to a position spaced above said central member; and
    an upper housing section enclosing said lower housing section and comprising an outer peripheral wall extending downwardly adjacent to and adhered to said peripheral grid and said lower housing peripheral wall.

2. The enclosure of claim 1, wherein said upper leg is ultrasonically welded to the top edge of said lower housing peripheral wall.

3. The enclosure of claim 2, wherein said outer peripheral wall is fused to said grid and said lower housing peripheral wall by a solvent bonding agent.

4. The enclosure of claim 3, further comprising a sealant on said downwardly extending leg at the position spaced above said central member and positioned upon said central member.

5. The enclosure of claim 4, wherein said housing sections comprise acrylonitrile-butadiene-styrene plastic.

6. An enclosure for an electrochemical cell, comprising:
    a lower housing section comprising a central member and an upstanding peripheral wall, the peripheral wall defining a top edge thereof;
    a grid insert comprising a peripheral upper leg attached to the top edge of said lower housing peripheral wall, and a downwardly extending leg extending to a position spaced above said central member; and
    an upper housing section enclosing said lower housing section.

7. The enclosure of claim 6, wherein said an upper housing section comprises an outer peripheral wall extending downwardly adjacent to and adhered to said peripheral grid and said lower housing peripheral wall.

* * * * *